(12) United States Patent
Ochi (10) Patent No.: US 8,267,135 B2
(45) Date of Patent: Sep. 18, 2012

(54) PNEUMATIC TIRE WITH TREAD HAVING CIRCUMFERENTIAL GROOVES AND LUG GROOVES

(75) Inventor: Naoya Ochi, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 1269 days.

(21) Appl. No.: 11/663,589

(22) PCT Filed: Sep. 22, 2005

(86) PCT No.: PCT/JP2005/017457
§ 371 (c)(1),
(2), (4) Date: Dec. 26, 2007

(87) PCT Pub. No.: WO2006/033383
PCT Pub. Date: Mar. 30, 2006

(65) Prior Publication Data
US 2008/0142133 A1    Jun. 19, 2008

(30) Foreign Application Priority Data

Sep. 24, 2004 (JP) ................. P2004-278493

(51) Int. Cl.
*B60C 11/03* (2006.01)
(52) U.S. Cl. ............. 152/209.8; 152/209.9; 152/209.15; 152/209.21; 152/209.24
(58) Field of Classification Search ............... 152/209.8, 152/209.9, 209.15, 209.18, 209.21, 209.24
See application file for complete search history.

(56) References Cited

U.S. PATENT DOCUMENTS

| | | | | |
|---|---|---|---|---|
| 5,423,364 A | * | 6/1995 | Himuro | 152/209.18 |
| 5,425,406 A | * | 6/1995 | Swift et al. | 152/209.8 |
| 6,311,748 B1 | * | 11/2001 | Boiocchi et al. | 152/903 |
| 2005/0247388 A1 | * | 11/2005 | Ohsawa et al. | 152/209.9 |

FOREIGN PATENT DOCUMENTS

| | | | |
|---|---|---|---|
| EP | 370699 | * | 5/1990 |
| EP | 718124 | * | 6/1996 |
| EP | 1 029 712 A1 | | 8/2000 |
| EP | 1 075 971 A1 | | 2/2001 |

(Continued)

OTHER PUBLICATIONS

Machine translation for Japan 2004-155416 (no date).*

(Continued)

*Primary Examiner* — Steven D Maki
(74) *Attorney, Agent, or Firm* — Sughrue Mion, PLLC (57) ABSTRACT

On a tread surface 1 of a pneumatic tire, at least one circumferential groove is formed on an outer-side region 3 in a vehicle width direction, at least three circumferential, which number is two or more larger than the outer-side region 3, grooves are formed on an inner-side region 2 in the vehicle width direction. A plurality of lug grooves 20 are formed on the tread surface 1, open to a tread edge TE1 of the inner-side region 3, extend in a direction toward circumferential groove 11, and terminate without opening to circumferential groove 11. A plurality of continuous lug grooves 21 are formed on the tread surface 1, open to a tread edge TE2 of the outer-side region 3, extend in a direction toward the circumferential groove 13, continue to the central land portion 5 intersecting the circumferential groove 10, and terminate without opening to the circumferential groove 13 which borders the central land portion 5, among the three second-region circumferential grooves 11, 12, 13.

16 Claims, 3 Drawing Sheets

FOREIGN PATENT DOCUMENTS

| | | |
|---|---|---|
| GB | 1 549 347 | 8/1979 |
| JP | 62-66805 U | 4/1987 |
| JP | 64-052507 A | 2/1989 |
| JP | 05-286312 A | 11/1993 |
| JP | 10-217719 A | 8/1998 |
| JP | 2000-238510 A | 9/2000 |
| JP | 2003-170706 A | 6/2003 |
| JP | 2004-90763 A | 3/2004 |
| JP | 2004-155416 * | 6/2004 |
| JP | 2004-155416 A | 6/2004 |
| WO | 2004/024471 * | 3/2004 |

OTHER PUBLICATIONS

Supplementary European Search Report dated Feb. 4, 2009 (6 pages).
International Search Report dated Dec. 16, 2005.

* cited by examiner

PNEUMATIC TIRE WITH TREAD HAVING CIRCUMFERENTIAL GROOVES AND LUG GROOVES

TECHNICAL FIELD

The present invention relates to a pneumatic tire having an asymmetric tread pattern. In particular, the present invention relates to a pneumatic tire having improved handling stability on a dry road surface and improved drainage performance on a wet road surface, and also having improved ride quality, improved low-noise performance, and improved wear resistance.

BACKGROUND ART

Heretofore, pneumatic tires each having a tread pattern which is asymmetric between outer and inner sides of a vehicle with respect to the vicinity of the tire equator when it is attached to a vehicle have been proposed. Generally, in a pneumatic tire having such an asymmetric tread pattern, on its tread surface, an outer side region of a vehicle, to be placed on the outer side of the vehicle, is provided with a pattern in which importance is placed on handling stability, and an inner side region of the vehicle, to be placed on the inner side of the vehicle, is provided with a pattern in which importance is placed on drainage performance.

As a specific form of such an asymmetric tread pattern, a pneumatic tire has been disclosed which includes circumferential grooves having different groove widths between the outer side region and the inner side region of a vehicle (e.g., see Japanese Unexamined Patent Application Laid-open Publication No. 2004-90763 (hereinafter referred to as Patent Document 1)). This asymmetric tread pattern can favorably improve drainage performance on a wet road surface, particularly hydroplaning resistance, and tire noise reduction.

Although the asymmetric tread pattern disclosed in Patent Document 1 can favorably improve drainage performance on a wet road surface, the asymmetric tread pattern cannot go as far as to effectively improve handling stability or wear resistance, which is in a trade-off relationship with the drainage performance.

In view of the above-described problem, an object of the present invention is to provide a pneumatic tire having an asymmetric tread pattern, having improved handling stability on a dry road surface and improved drainage performance on a wet road surface, and also having improved ride quality, improved low-noise performance, and improved wear resistance.

DISCLOSURE OF INVENTION

In order to achieve the above-described object, an aspect of the present invention is a pneumatic tire having a tread surface in which a plurality of circumferential grooves extending in a circumferential direction of the tire is formed. The plurality of circumferential grooves includes at least one first-region circumferential groove (e.g., outer-side circumferential groove 10) and at least three second-region circumferential grooves (e.g., inner-side circumferential grooves 11, 12, and 13). The one first-region circumferential groove is formed in a first region on one side of a tire equator line (CL), and the three second-region circumferential grooves are formed in a second region on the other side of the tire equator line (CL). The number of second-region circumferential grooves is two or more than the number of first-region circumferential grooves. The first-region shoulder land portion (e.g., outer-side shoulder land portion 6), a second-region shoulder land portion (e.g., inner-side shoulder land portion 4), and a central land portion (e.g., central land portion 5) are formed on the tread surface. The first-region shoulder land portion is bordered by the first-region circumferential groove. The second-region shoulder land portion is bordered by the second-region circumferential grooves. The central land portion is placed between the first-region circumferential groove and the second-region circumferential grooves. A plurality of continuous lug grooves (e.g., continuous lug grooves 21) and a plurality of lug grooves (e.g., lug grooves 20) are formed on the tread surface. The continuous lug grooves open to a tread edge TE2 of the first-region shoulder land portion, extend in a direction of the second-region circumferential grooves, intersect the first-region circumferential groove to continue to the central land portion, and terminate without opening to the second-region circumferential groove, which borders the central land portion, among the three second-region circumferential grooves. The lug grooves open to a tread edge TE1 of the second-region shoulder land portion, extend in a direction of the second-region circumferential grooves, and terminate without opening to the second-region circumferential grooves.

Here, the "tread surface" means the ground contacting surface of the tread under a specified internal pressure and a specified load which are specified in industrial standards (e.g., "JATMA Year Book" of Japan Automobile Tire Manufacturers Association in Japan, "TRA Year Book" in the United States, "ETRTO Standard Manual" in Europe) for each region where pneumatic tires are produced or used.

In the pneumatic tire according to the aspect of the present invention, the number of second-region circumferential grooves formed in a region of the tread surface on one side of the tire equator line (CL) is two or more than the number of first-region circumferential grooves formed in a region on the other side. Accordingly, functions of the tread surface are effectively divided between the first and second regions.

More specifically, in the first region of the tread surface, at least one first-region circumferential groove is formed. Accordingly, minimal drainage performance is ensured while the uneven wear of the first-region shoulder land portion is reduced, and lateral block rigidity in the second region is ensured to improve grip during cornering, whereby the handling stability of the pneumatic tire can be improved. On the other hand, in the second region of the tread surface, circumferential grooves of which number is two or more than that of the first region are formed. Accordingly, favorable drainage performance can be obtained, and the hydroplaning resistance of the pneumatic tire can be improved.

Moreover, The plurality of lug grooves formed in the second-region shoulder land portion are open to the tread edge of the shoulder land portion to contribute to ensuring drainage performance Further, since the plurality of lug grooves are not open to the second-region circumferential groove, the rigidity of the second-region shoulder land portion is improved. Thus, the low-noise performance and uneven wear resistance of the pneumatic tire can be improved.

Moreover, by the continuous lug grooves continuously extending from the first-region shoulder land portion to the central land portion, drainage performance in the first region having a smaller number of circumferential grooves can be improved. Further, since the continuous lug grooves are not open to the second-region circumferential groove, the central land portion is not partitioned but extends continuously in the circumferential direction of the tire. Thus, the rigidity of the central land portion is ensured, and the handling stability of the pneumatic tire can be improved for both dry driving and wet driving.

Moreover, in the pneumatic tire according to the aspect of the present invention, the plurality of circumferential grooves (e.g., outer-side circumferential groove 10 and inner-side circumferential grooves 11, 12, and 13) are preferably linear grooves or grooves having see-through portions along the circumferential direction when the tire contacts the ground.

Here, "when the tire contacts the ground" means a case where 80% of the maximum load is applied to the tire with a rim under an internal pressure which is specified by JATMA (Japan Automobile Tire Manufacturers Association). Further, the "see-through portions" mean portions through which water flows in the circumferential direction when the tire contacts the ground.

In this pneumatic tire, drainage performance can be further improved.

Moreover, the plurality of circumferential grooves preferably have different groove widths.

In this pneumatic tire, air column resonance in the grooves, which occurs in the case where grooves have linear shapes, can be reduced.

Moreover, in the pneumatic tire according to the aspect of the present invention, the second-region shoulder land portion preferably has an approximately-rib like shape.

Here, "an approximately-rib like shape" includes a case where the second-region shoulder is provided with shapes or narrow grooves which have such widths that the shapes or narrow grooves close when the tire contacts the ground. By providing such shapes or narrow grooves, the rigidity of a rib and uneven wear can be made compatible.

In this pneumatic tire, the rigidity of the second region can be ensured.

Moreover, in the pneumatic tire according to the aspect of the present invention, the first-region circumferential groove is preferably placed away from the tire equator line (CL) outward in the tire width direction by a distance of more than ¼ of the width of the ground contacting surface of the tire.

Here, "the width of the ground contacting surface of the tire" means the width of the ground contacting surface of the tread at the time when 80% of the maximum load is applied using a rim and an internal pressure which are specified by JATMA (Japan Automobile Tire Manufacturers Association).

In this pneumatic tire, hydroplaning resistance during cornering and the uneven wear property of the second-region shoulder land portion can be further improved.

Moreover, in the pneumatic tire according to the aspect of the present invention, the central land portion preferably contains the tire equator line (CL).

Moreover, in the pneumatic tire according to the aspect of the present invention, the lug grooves preferably terminate at a distance (e.g., distance W4) in the range of 5% to 90% of a land width (e.g., land width W7) of the second-region shoulder land portion from the second-region circumferential grooves, and the continuous lug grooves preferably terminate at a distance (e.g., distance W5) in the range of 5% to 60% of a land width (e.g., land width W8) of the central land portion from, the second-region circumferential groove, which borders the central land portion, among the three second-region circumferential grooves.

In this pneumatic tire, the distance from the ends (e.g., ends 20E) of the lug grooves formed in the second-region shoulder land portion to the second-region circumferential groove is in the range of 5% to 90% of the land width W7 of the second-region shoulder land portion. Accordingly, drainage performance in the second region can be ensured.

Further, the distance from the ends (e.g., ends 21E) of the continuous lug grooves in the central land portion to the second-region circumferential groove is in the range of 5% to 60% of the land width W8 of the central land portion. Accordingly, drainage performance in the first region can be ensured.

In the pneumatic tire according to the aspect of the present invention, the continuous lug grooves preferably each have a bent shape including a first inclined portion (e.g., first inclined portion 21a) and a second inclined portion (e.g., second inclined portion 21b). The first inclined portion is inclined at a first inclination angle with respect to the circumferential direction of the tire in the first-region shoulder land portion and the central land portion, and the second inclined portion is inclined in the central land portion in the same direction as the first inclined portion at a second inclination angle steeper than that of the first inclined portion with respect to the circumferential direction of the tire.

In this pneumatic tire, the continuous lug grooves have the second inclined portions having steeper inclination angles with respect to the circumferential direction of the tire than the first inclined portions, in the central land portion. Accordingly, drainage performance near the tread center (i.e., a ground contacting surface which is near to the center of the ground contacting surface of the tread and which greatly relates to the occurrence of hydroplaning) can be further improved.

Moreover, in the pneumatic tire according to the aspect of the present invention, the continuous lug grooves preferably have groove widths gradually widened toward ends (e.g., ends 21E) thereof.

In this pneumatic tire, water near the tread center is allowed to efficiently flow into the second inclined portions, and the water which has flowed into the second inclined portions can be smoothly expelled to the inner-side circumferential grooves. Thus, drainage performance near the tread center can be further improved. In particular, hydroplaning resistance can be improved.

Moreover, in the pneumatic tire according to the aspect of the present invention, at an inner edge of the central land portion in the tire width direction, protruding portions (e.g., protruding portions 5a) are preferably provided on a groove wall of the second-region circumferential groove (e.g., inner-side circumferential groove 13) at positions away from ends (e.g., ends 21E) of the continuous lug grooves inward in the tire width direction.

At the land portion edge near the ends portions of the continuous lug grooves, the widths of the ground contacting portions are small. This results in insufficient rigidity and affects wear. However, in this pneumatic tire, by providing the protruding portions, the above-described insufficient rigidity of the land portion edge can be compensated.

Moreover, each protruding portion preferably is a triangular shape when the tread surface is viewed in plan view, and preferably has a height gradually decreasing toward the second-region circumferential groove.

In this pneumatic tire, drainage performance and rigidity can be prevented from becoming too high.

Moreover, in the pneumatic tire according to the aspect of the present invention, at the inner edge of the central land portion in the tire width direction, chamfer portions (e.g., chamfer portions 5b) gradually decreasing toward the second-region circumferential groove (e.g., inner-side circumferential groove 13) are preferably provided in regions in which the protruding portions are not formed.

In this pneumatic tire, by gradually decreasing the height of part of the central land portion, a rigidity balance with the rigidity increased by the provision of the above-described protruding portions can be maintained.

Moreover, when the tread surface is viewed in plan view, one side of each protruding portion and that of the corresponding chamfer portion are preferably in a line, the protruding portion and the chamfer portion are preferably placed in contact with each other, and sizes of the protruding portion and the chamfer portion are preferably in a proportional relationship.

In this pneumatic tire, a rigidity balance between the protruding portion and the chamfer portion can be more effectively maintained.

Moreover, in the pneumatic tire according to the aspect of the present invention, the tread surface preferably further includes first subsidiary lug grooves (e.g., first subsidiary lug grooves 23) and second subsidiary lug grooves (e.g., second subsidiary lug grooves 24) formed at the midpoints between the adjacent continuous lug grooves. The first subsidiary lug grooves are open to the tread edge TE2 of the first-region shoulder land portion, and extend toward the first-region circumferential groove to be inclined in the same direction as the continuous lug grooves. The second subsidiary lug grooves are open to the first-region circumferential groove, extend toward the second-region circumferential groove to be inclined in the same direction as the continuous lug grooves, and terminate so as to connect with ends of the continuous lug grooves without opening to the second-region circumferential groove.

In this pneumatic tire, the rigidity of the first-region shoulder land portion can be appropriately reduced by forming the subsidiary lug grooves between the continuous lug grooves. Thus, ride quality can be improved, and drainage performance in the first-region shoulder land portion can be improved.

Moreover, in the pneumatic tire according to the aspect of the present invention, the second-region circumferential groove (e.g., inner-side circumferential groove 13) which is nearest to the tire equator line (CL) among the at least three second-region circumferential grooves preferably has the largest groove width (e.g., groove width W3).

In this pneumatic tire, since the second-region circumferential groove nearest to the tire equator line (CL) is formed to have the largest groove width, drainage performance near the tread center can be more efficiently improved. In particular, hydroplaning resistance can be improved.

Moreover, in the pneumatic tire according to the aspect of the present invention, a total sum (e.g., groove, width W1+W2+W3) of groove widths of the at least three second-region circumferential grooves is preferably in the range of 200% to 600% of a total sum (e.g., groove width W10) of a groove width of the at least one first-region circumferential groove.

In this pneumatic tire, since the total sum of the groove widths of the second-region circumferential grooves is equal to or greater than 200% of the total sum of the groove width of the first-region circumferential groove, the groove width of each of the second-region circumferential grooves can be appropriately ensured, and favorable drainage performance can be obtained. Further, since the total sum of the groove widths of the second-region circumferential grooves is equal to or less than 600% of the total sum of the groove width of the first-region circumferential groove, appropriate rigidity can be obtained in the tread surface in the second region, and handling stability on a dry road surface and a wet road surface can be favorably ensured.

BEST MODE FOR CARRYING OUT TIM INVENTION

Next, an embodiment of the present invention will be described with reference to drawings. In the description below of the drawings, the same or similar portions are denoted by the same or similar reference numerals It should be noted, however, that the drawings are schematic, and that the ratios and the like between dimensions differ from actual ones. Accordingly, specific dimensions and the like should be judged in consideration of the description below. Moreover, it is a matter of course that there are portions in which dimensional relationships and ratios differ among the drawings.

Configuration of Pneumatic Tire

Figure 1:
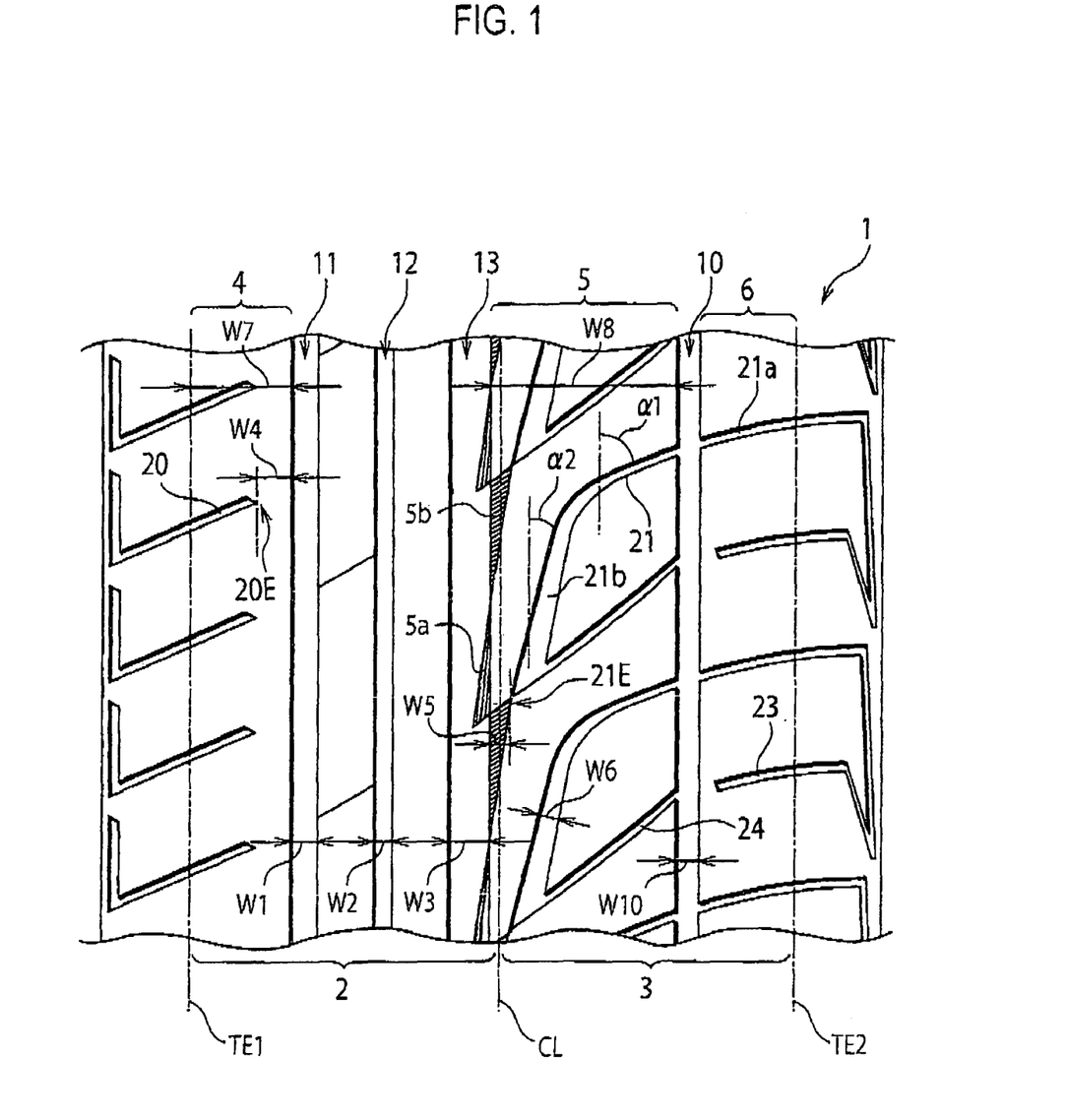
FIG. 1 is a partial developed plan view of a tread of a pneumatic tire according to an embodiment of the present invention and Example 1.

FIG. 1 is a partial developed view of a tread surface 1 of a pneumatic tire according to an embodiment of the present invention. Further, FIG. 1 is a view of the pneumatic tire as viewed in plan view in a state in which the pneumatic tire is attached to a vehicle.

The tread surface 1 is virtually divided into two regions along the tire equator line (CL). In this embodiment, the tread surface 1 is assumed to be divided along the tire equator line (CL) into an inner-side region 2 which is near to the inside of the vehicle when the tire is attached to the vehicle, and an outer-side region 3 which is near to the outside of the vehicle.

In the inner-side region 2, three inner-side circumferential grooves 11, 12, and 13 parallel to the tire equator line (CL) are formed, and an inner-side shoulder land portion 4 is formed on a tread edge TE1 side to be bordered by the inner-side circumferential groove 11. This inner-side shoulder land portion 4 has an approximately-rib like shape.

In the inner-side shoulder land portion 4, lug grooves 20 are formed which are open to the tread edge TE1 and which extend toward the inner-side circumferential groove 11. The lug grooves 20 are open to the tread edge TE1 but not open to the inner-side circumferential groove 11 to terminate at ends 20E at a distance W4 away from the inner-side circumferential groove 11.

Further, The distance W4 is in the range of 5% to 90% of a land width W7 of the inner-side shoulder land portion 4.

In the outer-side region 3, an outer-side circumferential groove 10 parallel to the tire equator line (CL) is formed, and an outer-side shoulder land portion 6 is formed on a tread edge TE2 side to be bordered by the outer-side circumferential groove 10.

This outer-side circumferential groove 10 is placed away from the tire equator line (CL) outward in the tire width direction by a distance of more than ¼ of the width of the ground contacting surface of the tire.

Near the tread center of the tread surface 1, a central land portion 5 is formed to be bordered by the outer-side circumferential groove 10 formed in the outer-side region 3 and the inner-side circumferential groove 13 formed in the inner-side region 2. This central land portion 5 contains the tire equator line (CL). Further, the inner-edge of the central land portion 5 in the tire width direction is located in a region which is centered on the tire equator line (CL) and which has a width of ±15% of the width of the ground contacting surface of the tire.

Further, in the outer-side region 3, continuous lug grooves 21 are formed which extend from the outer-side shoulder land portion 6 to the central land portion 5. The continuous lug grooves 21 are open to the tread edge TE2 in the outer side shoulder land portion 6 to extend in the direction of the inner-side circumferential groove 13, intersect the outer-side circumferential groove 10 to continue to the central land portion 5, and terminate at ends 21E in the central land portion 5 without opening to the inner-side circumferential groove 13 bordering the central land portion 5.

The ends 21E are positioned at a distance W5 away from the circumferential groove 18. The distance W5 is in the range of 5% to 60% of a land width W8 of the central land portion 5.

In addition, The continuous lug groove 21 includes a first inclined portion 21a having an approximately linear shape inclined at an angle $\alpha 1$ with respect to the circumferential direction of the tire in the outer-side shoulder land portion 6 and the central land portion 5, and a second inclined portion 21b having an approximately linear shape inclined at an angle $\alpha 2$ with respect to the circumferential direction of the tire in the central land portion 5. Also, since the angle $\alpha 2$ is steeper with respect to the circumferential direction of the tire than the angle $\alpha 1$, the continuous lug groove 21 has a bent shape including the first and second inclined portions 21a and 21b. Additionally, the groove width W6 of the continuous lug groove 21 is formed to gradually widen toward the end 21E.

In addition, the lug groove 20 and the continuous lug groove 21 are preferably inclined toward the tread edges (tread edges TE1 and TE2) to which they are open, respectively, at angles in the range of 45 degrees to 90 degrees with respect to the tire equator line (CL) when the tread is viewed in plan view.

Moreover, in the outer-side region 3 of the tread surface 1, subsidiary lug grooves 23 extending approximately parallel to the continuous lug grooves 21 are formed at approximately the midpoints between the adjacent continuous lug grooves 21 in the outer-side shoulder land portion 6. The subsidiary lug grooves 23 are open to the tread edge TE2 of the outer-side shoulder land portion 6 but not open to the outer-side circumferential groove 10 to terminate.

Furthermore, In the central land portion 5, subsidiary lug grooves 24 are formed which are open to the outer-side circumferential groove 10, which extend toward the inner-side circumferential groove 13 in the inner-side region 2 in approximately the same direction as the continuous lug grooves 21, and which are connected to the continuous lug grooves 21 at the ends 21E of the continuous lug grooves 21 without opening to the inner-side circumferential groove 13. The subsidiary lug grooves 23 and 24 are preferably formed near approximately the midpoints between the adjacent continuous lug grooves 21.

In addition, in this embodiment, among the four circumferential grooves 10 to 13 formed in the above-described tread surface 1, the circumferential groove 13, which is the circumferential groove nearest to the tire equator line (CL), has the largest groove width. For example, among the groove widths W1, W2, W3, and W10 shown in FIG. 1, the groove width W3 is the largest.

In addition, The total sum (groove width W1+W2+W3) of the groove widths of the inner-side circumferential grooves 11, 12, and 13 in the inner-side region 2 is in the range of 200% to 600% of the groove width (groove width W10) of the outer-side, circumferential groove 10 in the outer-side region 3. That is, $(W10 \times 2) \leq (W1+W2+W3) \leq (W10 \times 6)$.

In addition, in this embodiment, the plurality of circumferential grooves 10, 11, 12, and 13 in the tread surface 1 are linear grooves or grooves having see-through portions along the circumferential direction when the tire contacts the ground. Further, this plurality of circumferential grooves 10, 11, 12, and 13 have different groove widths W1, W2, W3, and W10

In addition, the pneumatic tire according to this embodiment has, at the inner edge of the central land portion 5 in the tire width direction, protruding portions 5a on a groove wall of the inner-side circumferential groove 13 at positions away from the ends 21E of the continuous lug grooves 21 inward in the tire width direction. The protruding portions 5a have triangular shapes when the tread is viewed in plan view as shown in FIG. 1, and the heights of the protruding portions 5a gradually decrease toward the inner-side circumferential groove 13.

Further, the pneumatic tire according to this embodiment has, at the inner edge of the central land portion 5 in the tire width direction, chamfer portions 5b gradually decreasing toward the inner-side circumferential groove 13 in regions in which the protruding portions 5a are not placed. Also, the depths of the chamfer portions 5b also gradually decrease from the ends 21E of the continuous lug grooves 21 in the circumferential direction. Moreover, the chamfer portions 5b have triangular shapes when the tread is viewed in plan view as shown in FIG. 1

Further, when the tread is viewed in plan view, one side of the protruding portion 5a and that of the chamfer portion 5b are in a line, and the protruding portion 5a and the chamfer portion 5b are placed in contact with each other. Specifically, as shown in FIG. 1, the protruding portion 5a and the chamfer portion 5b preferably have triangular shapes, bases thereof are preferably in a line, and the protruding portion 5a and the chamfer portion 5b are preferably placed in contact with each other. Furthermore, the sides of the protruding portion 5a and the chamfer portion 5b are preferably in a proportional relationship.

As described above, in the inner-side region 2, the tread surface 1 of the pneumatic tire of this embodiment has a rib-based tread pattern in which the three circumferential grooves 11, 12, and 13 and the lug grooves 20 not open to the circumferential groove 11 are formed, and therefore has excellent drainage performance, low-noise performance, and wear resistance. In the outer-side region 3, a block-based tread pattern is formed by one circumferential groove 10 and the continuous lug grooves 21 and the subsidiary lug grooves 24 intersecting the circumferential groove 10, and therefore excellent traction performance and brake performance on a dry road surface and a wet road surface are obtained. Thus, the pneumatic tire of this embodiment has an asymmetric tread pattern in which the inner-side region 2 and the outer-side region 3 on opposite sides of the tire equator line (CL) have different tire performances (functions).

EFFECTS AND ADVANTAGES

In the pneumatic tire according to this embodiment, the number of inner-side circumferential grooves 11, 12, and 13 formed in the tread surface 1 is two or more than the number of outer-side circumferential grooves 10. Accordingly, functions of the tread surface 1 are effectively divided between the outer-side region 3 and the inner-side region 2

More specifically, in the outer-side region 3 of the tread surface 1, at least one outer-side circumferential groove 10 is formed. Accordingly, minimal drainage performance is ensured while the uneven wear of the outer-side shoulder land portion 6 is reduced, and lateral block rigidity in the inner-side region 2 is ensured to improve grip during cornering, whereby the handling stability of the pneumatic tire can be improved. On the other hand, in the inner-side region 2 of the tread surface 1, circumferential grooves of which number is two or more larger than that of the outer-side region 3 are formed. Accordingly, favorable drainage performance can be obtained, and the hydroplaning resistance of the pneumatic tire can be improved.

In addition, the plurality of lug grooves 20 formed in the inner-side shoulder land portion 4 are open to the tread edge TE1 of the inner-side shoulder land portion 4 to contribute to ensuring drainage performance. Further, since the plurality of lug grooves 20 are not open to the inner-side circumferential groove 11, the rigidity of the inner-side shoulder land portion 4 is improved. Thus, the low-noise performance and uneven wear resistance of the pneumatic tire can be improved.

Moreover, by the continuous lug grooves 21 continuously extending from the outer-side shoulder land portion 6 to the central land portion 5, drainage performance in the outer-side region 3 having a smaller number of circumferential grooves can be improved. Further, since the continuous lug grooves 21 are not open to the inner-side circumferential groove 13, the central land portion 5 is not partitioned but extends continuously in the circumferential direction of the tire. Thus, the rigidity of the central land portion 5 is ensured, and the handling stability of the pneumatic tire can be improved for both dry driving and wet driving.

Moreover, in the pneumatic tire according to this embodiment, the plurality of circumferential grooves 10, 11, 12, and 13 are linear grooves or grooves having see-through portions along the circumferential direction when the tire contacts the ground. Accordingly, drainage performance can be further improved.

Moreover, the plurality of circumferential grooves 10, 11, 12, and 13 have different groove widths. Accordingly, air column resonance in the grooves, which occurs in the case where grooves have linear shapes, can be reduced.

Moreover, in the pneumatic tire according to this embodiment, the inner-side shoulder land portion 4 has an approximately-rib like shape. Accordingly, the rigidity of the inner-side region 2 can be ensured.

Moreover, in the pneumatic tire according to this embodiment, the outer-side circumferential groove 10 is placed away from the tire equator line (CL) outward in the tire width direction by a distance of more than ¼ of the width of the ground contacting surface of the tire. Accordingly, hydroplaning resistance during cornering and the uneven wear property of the inner-side shoulder land portion 4 can be further improved.

Moreover, in the pneumatic tire according to this embodiment, the distance W4 from the ends 20E of the lug grooves 20 formed in the inner-side shoulder land portion 4 to the inner-side circumferential groove 11 is in the range of 5% to 90% of the land width W7 of the inner-side shoulder land portion 4. Accordingly; drainage performance in the inner-side region 2 can be ensured.

If the distance W4 is shorter than 5% of the land width W7 of the inner-side shoulder land portion 4, the block rigidity of the inner-side shoulder land portion 4 decreases, and uneven wear becomes prone to occur in the inner-side shoulder land portion 4. This is not preferable. Further, if the distance W4 is longer than 90% of the land width W7 of the inner-side shoulder land portion 4, the groove lengths of the lug grooves 20 are not enough, and the drainage performance of the inner-side shoulder land portion 4 decreases. This is not preferable.

Moreover, the distance W5 from the ends 21E of the continuous lug grooves 21 in the central land portion 5 to the inner-side circumferential groove 13 is in the range of 5% to 60% of the land width W8 of the central land portion 5. Accordingly, drainage performance in the outer-side region 3 can be ensured.

If the distance W5 is shorter than 5% of the land width W8 of the central land portion 5, the block rigidity of the central land portion 5 decreases, and handling stability for dry-road driving and wet-road driving decreases. This is not preferable. Further, if the distance W5 is longer than 60% of the land width W8 of the central land portion 5, drainage performance near the tread center is decreased, the block rigidity of the central land portion 5 becomes too high, and thereby, handling stability and ride quality may decrease. This is not preferable.

Moreover, in the pneumatic tire according to this embodiment, the continuous lug grooves 21 each include, in the central land portion 5, the second inclined portion 21b having a steeper inclination angle with respect to the circumferential direction of the tire than the first inclined portion 21a. Accordingly, drainage performance near the tread center can be further improved.

Moreover, the continuous lug grooves 21 have the groove width W6 gradually widened in the central land portion 5 toward the ends 21E which are not open to the inner-side circumferential groove 13. Accordingly, water near the tread center is allowed to efficiently flow into the second inclined portions 21b, and the water which has flowed into the second inclined portions 21b can be smoothly expelled to the inner-side circumferential grooves. Thus, drainage performance near the tread center can be further improved. In particular, hydroplaning resistance can be improved.

Moreover, in the central land portion 5 of the pneumatic tire according to this embodiment, at the land portion edge near the ends of the continuous lug grooves 21, the widths of the ground contacting portions are small. This results in insufficient rigidity and affects wear. However, at the inner edge of the central land portion 5 in the tire width direction, the protruding portions 5a are provided on a groove wall of the inner-side circumferential groove 13 at positions away from the ends 21E, at which the continuous lug grooves 21 terminate, inward in the tire width direction. Accordingly, the above-described insufficient rigidity of the land portion edge can be compensated.

Moreover, the above-described protruding portions 5a have triangular shapes when the tread is viewed in plan view, and the heights of the protruding portions 5a gradually decrease toward the inner-side circumferential groove 13. Accordingly, drainage performance and rigidity can be prevented from becoming too high.

Moreover, in the pneumatic tire according to this embodiment, at the inner edge of the central land portion 5 in the tire width direction, the chamfer portions 5b gradually decreasing toward the inner-side circumferential groove 13 are provided in regions in which the protruding portions 5a are not placed. Accordingly, a rigidity balance with the rigidity increased by the provision of the above-described protruding portions 5a can be maintained.

Moreover, a rigidity balance between the protruding portion 5a and the chamfer portion 5b can be more effectively maintained in the following case: when the tread is viewed in plan view, one side of each protruding portion 5a and that of the corresponding chamfer portion 5b are in a line, the protruding portion 5a and the chamfer portion 5b are placed in contact with each other, and the sizes of the protruding portion 5a and the chamfer portion 5b are in a proportional relationship.

Moreover, if only the continuous lug grooves 21 are provided, ride quality may decrease. This is because rigidity in the outer-side region 3 in the circumferential direction of the tire is too high. Accordingly, in the pneumatic tire according to this embodiment, rigidity in the circumferential direction of the tire is made appropriate by providing the subsidiary lug grooves 23 and 24 between the continuous lug grooves 21. Thus, ride quality can be improved, and drainage performance in the inner-side shoulder land portion 6 can be improved. Further, the subsidiary lug grooves 23 and 24 are also intended to compensate for the drainage performance of the continuous lug grooves 21 in the shoulder land portion 6 in an auxiliary manner, and are therefore preferably formed near approximately the midpoints between the adjacent continuous lug grooves 21.

Moreover, in the pneumatic tire according to this embodiment, the inner-side circumferential groove 13 which is nearest to the tire equator line (CL) among the at least three inner-side circumferential grooves 11, 12, and 13, has the largest groove width W3 among the plurality of circumferential grooves. Accordingly, drainage performance near the tread center can be more efficiently improved. In particular, hydroplaning resistance can be improved.

Moreover, in the pneumatic tire according to this embodiment, the total sum (groove width W1+W2+W3) of the groove widths of the at least three inner-side circumferential grooves 11, 12, and 13 is equal to or greater than 200% of the total sum (groove width W10) of the groove width of the at least one outer-side circumferential groove 10. Accordingly, the groove width of each of the inner-side circumferential grooves 11, 12, and 13 can be appropriately ensured, and favorable drainage performance can be obtained. Further, since the total sum of the groove widths of the inner-side circumferential grooves 11, 12, and 13 is equal to or less than 600% of the total sum of the groove width of the outer-side circumferential groove 10, appropriate rigidity can be obtained in the tread surface 1 in the inner-side region 2, and handling stability on a dry road surface and a wet road surface can be favorably ensured.

Moreover, in the pneumatic tire according to this embodiment, the lug grooves 20 and the continuous lug grooves 21 are preferably inclined at angles in the range of 46 degrees to 90 degrees with respect to the tread edge (tread edges TE1 and TE2) to which the lug grooves 20 and the continuous lug grooves 21 are open. If these angles are less than 45 degrees, sharp portions are provided in blocks of the shoulder land portions, and the block rigidity of the shoulder land portions decreases. This is not preferable.

EXAMPLES

Hereinafter, examples of tires according to the present invention will be described in detail. In order to confirm effects of the present invention, two types of tires of examples to which the present invention is applied and one type of tire of a conventional example were manufactured, and evaluation tests were carried out. It should be noted that pneumatic tires according to the present invention are not limited to ones described in the following examples, and that the present invention can be carried out by making an appropriate modification without changing the spirit of the present invention.

The pneumatic tire of Example 1 has a configuration equivalent to that of the tread surface 1 of the pneumatic tire of the aforementioned embodiment, as shown in FIG. 1.

Figure 2:
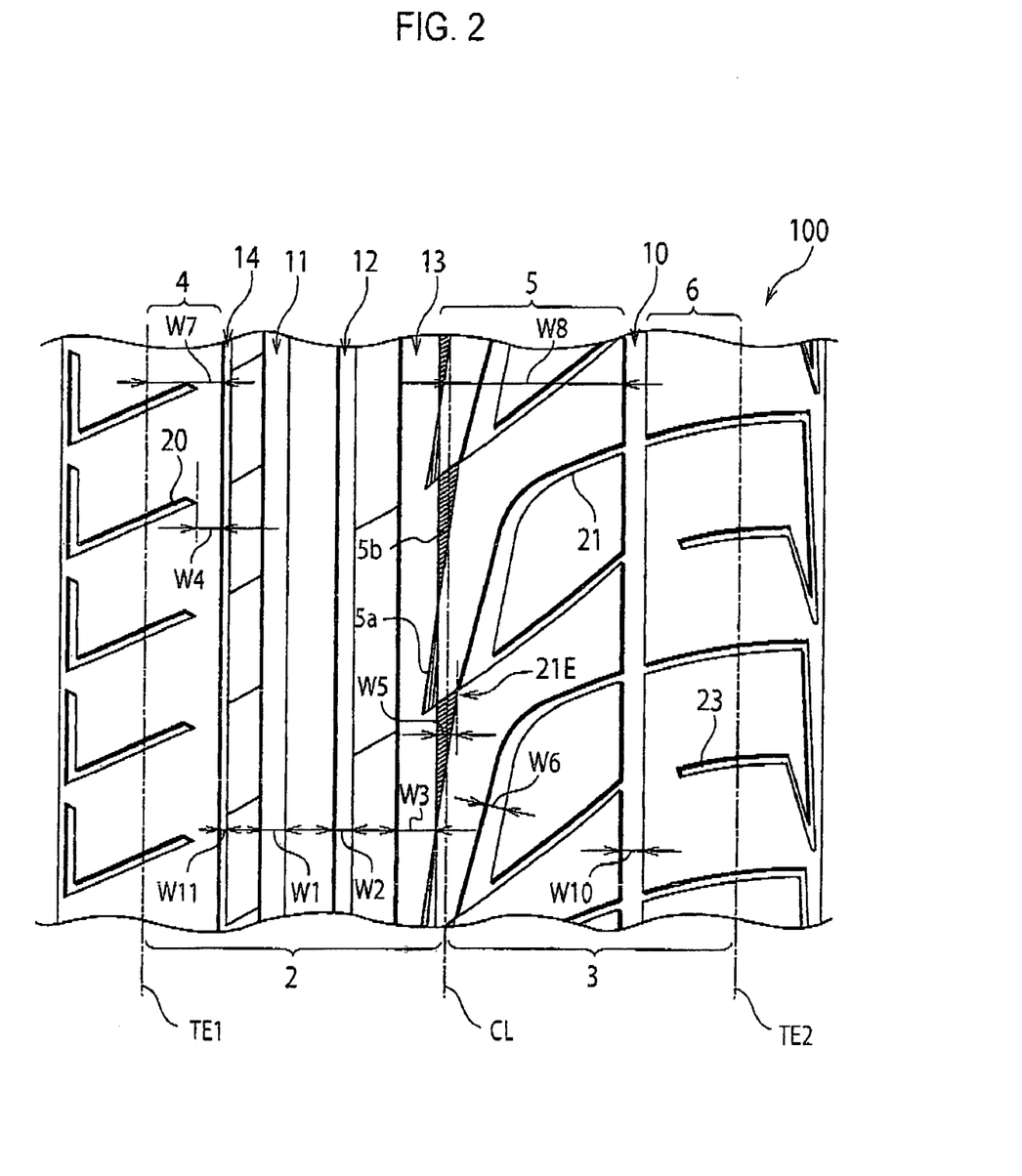
FIG. 2 is a partial developed plan view of a tread of a pneumatic tire according to Example 2

The pneumatic tire of Example 2 is a pneumatic tire having a tread surface 100 as shown in FIG. 2, and differs from the tread surface 1 shown in FIG. 1 in that another inner-side circumferential groove 14 is added to the inner-side region.

Figure 3:
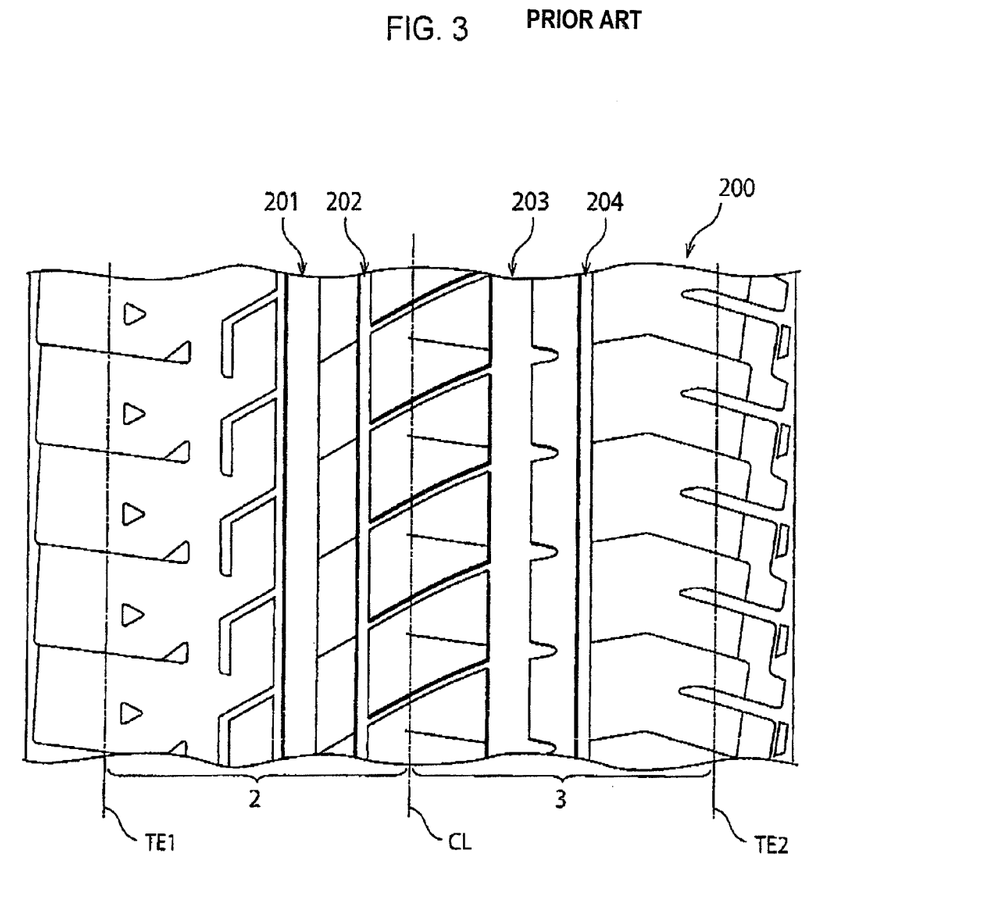
FIG. 3 is a partial developed plan view of a tread of a pneumatic tire according to a conventional example.

The pneumatic tire of the conventional example has a tread surface 200 which is asymmetric with respect to the tire equator line (CL) as shown in FIG. 3. The tread surface 200 is virtually divided into the inner-side region 2 and the outer-side region 3 along the tire equator line (CL), and includes a total of four circumferential grooves 201 to 204, which are formed in such a manner that two are formed in the inner-side region 2 and that the other two are formed in the outer-side region 3.

Conditions of the pneumatic tires used in the evaluations are as follows:
Common to Conventional Example and Examples 1 and 2
Tire Size: 225/45R17
Depth of Circumferential Groove: 8.3 mm
Load: Equivalent to Actual Vehicle with Two Occupants
Internal Pressure of Tire: 230 kpa Next, dimensions of each portion of the tread surface 1 of the pneumatic tires of Examples 1 and 2 are shown in Tables 1 and 2.

TABLE 1

| | Example 1 | |
|---|---|---|
| Inner-Side Region | Number of Circumferential Grooves | 3 |
| | Circumferential Groove 11's Width (W1) | 8.0 mm |
| | Circumferential Groove 12's Width (W2) | 5.0 mm |
| | Circumferential Groove 13's Width (W3) | 12.0 mm |
| | Lug Groove 20's Width | 3.0 mm |
| | Distance from Lug Grooves 20 (W4) | 34.0% (Percentage of Shoulder Land Portion's Width W7) |
| Outer-Side Region | Number of Circumferential Grooves | 1 |
| | Circumferential Groove 10's Width (W10) | 7.0 mm |
| | Continuous Lug Groove 21's Width | 3.0 mm (Shoulder Portion 6) |
| | Continuous Lug Groove 21's Width (W6) | 3.0 mm (Near Opening of Circumferential Groove 10) |
| | Continuous Lug Groove 21's Width (W6) | 7.5 mm (Near End 21E) |
| | Distance from Continuous Lug Grooves 21 (W5) | 12.5% (Percentage of Central Land Portion's Width W8) |
| | Subsidiary Lug Groove 23's Width | 2.0 mm |
| | Total Groove Width Ratio (Outer-Side Region:Inner-Side Region) | 100:357 |

TABLE 2

| | Example 2 | |
|---|---|---|
| Inner-Side Region | Number of Circumferential Grooves | 4 |
| | Circumferential Groove 14's Width (W11) | 2.0 mm |
| | Circumferential Groove 11's Width (W1) | 8.0 mm |
| | Circumferential Groove 12's Width (W2) | 4.0 mm |
| | Circumferential Groove 13's Width (W3) | 10.0 mm |
| | Lug Groove 20's Width | 3.0 mm |
| | Distance from Lug Grooves 20 (W4) | 34.0% (Percentage of Shoulder Land Portion's Width W7) |

TABLE 2-continued

Example 2

| | | |
|---|---|---|
| Outer-Side Region | Number of Circumferential Grooves | 1 |
| | Circumferential Groove 10's Width (W10) | 7.0 mm |
| | Continuous Lug Groove 21's Width | 3.0 mm (Shoulder Portion 6) |
| | Continuous Lug Groove 21's Width (W6) | 3.0 mm (Near Opening of Circumferential Groove 10) |
| | Continuous Lug Groove 21's Width (W6) | 7.5 mm (Near End 21E) |
| | Distance from Continuous Lug Grooves 21 (W5) | 12.5% (Percentage of Central Land Portion's Width W8) |
| | Subsidiary Lug Groove 23's Width | 2.0 mm |
| Total Groove Width Ratio (Outer-Side Region:Inner-Side Region) | | 100:292 |

Evaluation tests were carried out by attaching each of the above-described pneumatic tires according to Examples 1 and 2 and the conventional example to an actual vehicle and running the vehicle, based on feeling evaluations by a test driver aid wear resistance evaluations. The contents of the evaluations are as follows:

1) Wet condition hydroplaning (Straight) Test: A feeling evaluation at a critical speed at which hydroplaning occurs on a wet road surface having a water depth of 5 mm in a straight course.

2) Wet condition hydroplaning (Cornering) Test: A feeling evaluation at a critical speed at which hydroplaning occurs on a wet road surface having a water depth of 5 mm in a curved course.

3) Dry Handling Stability Test: A feeling evaluation of handling stability during sport deriving in various driving nodes in a circuit course in a dry condition.

4) Wet Handling Stability Test: A feeling evaluation of handling stability during sport driving in various driving modes in a circuit course in a wet condition.

5) Tire Noise Test (Low-Noise Performance Test): A feeling evaluation of tire noise which occurs during driving in various driving modes on an ordinary paved road in a dry state.

6) Ride Quality Test: A feeling evaluation of ride quality during driving in various driving modes on an ordinary paved road in a dry condition.

7) Wear Resistance Test: An evaluation of the amount of uneven wear (amount of step wear) which occurs between adjacent blocks of the tread surface, after 5000 km driving in various driving modes on an ordinary paved road in a dry condition.

It should be noted that with regard to a method of calculating the amount of uneven wear in the wear resistance test, the difference in remaining grooves between the forward side and the backward side between adjacent blocks was measured in all the shoulder blocks along the circumferences of both shoulder portions of the pneumatic tire, the average of these was calculated to be converted into a step wear amount (index) which is normalized so that the average obtained by measuring the pneumatic tire according to the conventional example equals 100.

In Table 3, the results of the above-described tests 1) to 7) are shown. With regard to evaluation values, larger values show better results.

TABLE 3

| | Conventional Example | Example 1 | Example 2 |
|---|---|---|---|
| Wet condition Hydroplaning (Straight) Test | 100 | 113 | 111 |
| Wet condition Hydroplaning (Cornering) Test | 100 | 105 | 104 |
| Dry Handling Stability Test | 100 | 110 | 107 |
| Wet Handling Stability Test | 100 | 108 | 107 |
| Tire Noise Test | 100 | 103 | 104 |
| Ride Quality Test | 100 | 107 | 109 |
| Uneven Wear Resistance Test | 100 | 105 | 106 |

Results

As shown in Table 3, both the pneumatic tires according to Examples 1 and 2 showed better results in all the tests than the pneumatic tire according to the conventional example.

From the above, it has been proved that the pneumatic tire according to the present invention has improved handling stability on a dry road surface and improved drainage performance on a wet road surface, and also has improved ride quality, improved low-noise performance, and improved wear resistance.

INDUSTRIAL APPLICABILITY

As described above, the pneumatic tire according to the present invention has improved handling stability on a dry road surface and improved drainage performance on a wet road surface, and also has improved ride quality, improved low-noise performance, and improved wear resistance. Accordingly, the pneumatic tire according to the present invention can be favorably used as a tire for a vehicle for the purpose of improving the aforementioned.

The invention claimed is:

1. A pneumatic tire comprising a tread surface in which a plurality of circumferential grooves extending in a circumferential direction of the tire is formed, wherein, the plurality of circumferential grooves includes at least one first-region circumferential groove (10) formed in a first region on one side of a tire equator line (CL), and at least three second-region circumferential grooves (11, 12, 13) formed in a second region on other side of the tire equator line (CL), the first region being provided to an outer side of a vehicle and the second region being provided to an inner side of the vehicle when the tire is mounted thereon, the number of the second-region circumferential grooves (11, 12, 13) is two or more larger than the number of the first-region circumferential groove (10), at least a first-region shoulder land portion (6) bordered by the first-region circumferential groove (10), a second-region shoulder land portion (4) bordered by the second-region circumferential grooves (11, 12, 13), and a central land portion (5) placed between the first-region circumferential groove (10) and the second-region circumferential grooves (11, 12, 13) are formed on the tread surface, and a plurality of continuous lug grooves (21) and a plurality of lug grooves (20) are formed on the tread surface, the continuous lug grooves (21) open to a tread edge (TE2) of the first-region shoulder land portion (6), extend in a direction toward the second-region circumferential grooves (11, 12, 13), continue into the central land portion (5) intersecting the first-region circumferential groove (10), and terminate without opening to the second-region circumferential groove (13), which borders the central land portion (5), among the three second-region circumferential grooves (11, 12, 13), the lug grooves (20) open to a tread edge (TEl) of the second-region shoulder land portion (4), extending in a direction toward the second-region circumferential grooves (11, 12, 13) and terminate without opening to the second-region circumferential grooves (11, 12, 13).

2. The pneumatic tire according to claim 1, wherein each of the plurality of circumferential grooves is any one of a linear groove and a groove includes a see-through portion along the circumferential direction when the tire contacts a ground.

3. The pneumatic tire according to claim 2, wherein the plurality of circumferential grooves have different groove widths (W1, W2, W3, W10).

4. The pneumatic tire according to claim 1, wherein the second-region shoulder land portion (4) has an approximately—rib like shape.

5. The pneumatic tire according to claim 1, wherein the first-region circumferential groove (10) is placed away from the tire equator line (CL) outward in a tire width direction by a distance of more than ¼ of a width of a ground contacting surface of the tire.

6. The pneumatic tire according to claim 1, wherein the central land portion (5) is located on the tire equator line (CL).

7. The pneumatic tire according to claim 1, wherein
the lug grooves (20) terminate at a distance (W4) in the range of 5% to 90% of a land width (W7) of the second-region shoulder land portion (4) from the second-region circumferential grooves (11, 12, 13), and
the continuous lug grooves (21) terminate at a distance (W5) in the range of 5% to 60% of a land width (W8) of the central land portion (5) from the second-region circumferential groove (13), which borders the central land portion (5), among the three second-region circumferential grooves (11, 12, 13).

8. The pneumatic tire according to claim 1, wherein the continuous lug grooves (21) each have a bent shape includes a first inclined portion (21*a*) and a second inclined portion (21*b*), the first inclined portion (21*a*) inclines at a first inclination angle with respect to the circumferential direction of the tire in the first-region shoulder land portion (6) and the central land portion (5), the second inclined portion (21*b*) inclines in the same direction as the first inclined portion at a second inclination angle in the central land portion (5), the second inclination angle is steeper than that of the first inclined portion with respect to the circumferential direction of the tire.

9. The pneumatic tire according to claim 8, wherein the continuous lug grooves (21) have groove widths gradually widened toward ends (21E) thereof.

10. The pneumatic tire according to claim 1, further comprising protruding portions (5*a*) formed on a groove wall of the second-region circumferential groove (13) which is located at the inner side in the tire width direction of the end (21E) of the continuous lug grooves (21), in an inner edge side in the tire width direction of the central land portion (5).

11. The pneumatic tire according to claim 10, wherein each protruding portion (5*a*) has a triangular shape when the tread surface is viewed in plan view, and has a height gradually decreasing toward the second-region circumferential groove (13).

12. The pneumatic tire according to claim 10, further comprising chamfer portions (5*b*) formed on regions in which the protruding portions (5*a*) are not formed, in the inner edge side in the tire width direction of the central land portion (5), each of the chamfer portions (5*b*) is gradually decreasing toward the second-region circumferential groove (13).

13. The pneumatic tire according to claim 12, wherein
when the tread surface is viewed in plan view, the protruding portion (5*a*) and the chamfer portion (5*b*) are placed at positions where one side of the protruding portion (5*a*) and one side of the chamfer portion (5*b*) are in a line, and where the protruding portion (5*a*) and the chamfer portion (5*b*) are in contact with each other, and
sizes of the protruding portion 5*a* and the chamfer portion (5*b*) are in a proportional relationship.

14. The pneumatic tire according to claim 1, wherein first subsidiary lug grooves (23) and second subsidiary lug grooves (24) are formed on the tread surface between the adjacent continuous lug grooves (21), the first subsidiary lug grooves (23) open to the tread edge (TE2) of the first-region shoulder land portion (6), extend toward the first-region circumferential groove (10), and incline in the same direction as the continuous lug grooves (21), the second subsidiary lug grooves (24) open to the first-region circumferential groove (10), extend toward the second-region circumferential groove (13), incline in the same direction as the continuous lug grooves (21), and terminate so as to connect with an end (21E) of the corresponding continuous lug groove (21) without opening to the second-region circumferential groove (13).

15. The pneumatic tire according to claim 1, wherein the second-region circumferential groove (13) which is the nearest to the tire equator line (CL) among the at least three second-region circumferential grooves (11, 12, 13), has the largest groove width.

16. The pneumatic tire according to claim 1, wherein a total sum of groove widths of the at least three second-region circumferential grooves (11, 12, 13) is in the range of 200% to 600% of a total sum of a groove width of the at least one first-region circumferential groove (10).

* * * * *